H. KLECKLER.
AILERON SYSTEM.
APPLICATION FILED JAN. 28, 1915.

1,210,379.

Patented Dec. 26, 1916.
2 SHEETS—SHEET 1.

Witnesses
Samuel Payne
Marie Adams

Inventor
HENRY KLECKLER.
By
Attorney

UNITED STATES PATENT OFFICE.

HENRY KLECKLER, OF HAMMONDSPORT, NEW YORK.

AILERON SYSTEM.

1,210,379.      Specification of Letters Patent.      Patented Dec. 26, 1916.

Application filed January 28, 1915. Serial No. 4,839.

*To all whom it may concern:*

Be it known that I, HENRY KLECKLER, a citizen of the United States, residing at Hammondsport, in the county of Steuben and State of New York, have invented certain new and useful Improvements in Aileron Systems, of which the following is a specification.

The quick detachable aileron system of my invention comprises balancing rudders of any of the approved types movable about horizontally disposed pivotal axes from normal positions substantially parallel to the main supporting surfaces of the craft through ranges at an acute angle thereto, locked in pivotal connection with the main supporting surfaces throughout their operative ranges, and unlocked from pivotal connection therewith and rendered detachable therefrom by movement to a plane substantially vertical to the main supporting surfaces and translation bodily in said plane, together with an operating device and a snap connection between said operating device and said balancing surfaces.

By means of my invention the balancing ailerons of an aeroplane may be attached or detached in a moment. In attaching the aileron it is presented to its axis in a substantially vertical position, moved bodily in the plane it occupies until it reaches its axis, then turned quickly to normal position and the cable connection to the operating device snapped on. By such movement about its axis to normal position the aileron is locked in position, and once the operating connection has been snapped on it is securely locked against all except intentional removal. In detaching it the operating connection is unsnapped, the aileron turned quickly to a substantially vertical position, and moved slightly in the plane of this position bodily to free it from its axis. The value of such an arrangement for cutting down the time required for assembling and knocking down aircraft for military use is very great. Moreover the life of the craft is materially increased, for in normal use a craft is knocked down and assembled oftentimes daily, and when the handling of these comparatively light parts is cut down to such a minimum there is practically no such thing as wear and tear on them.

In the accompanying drawings is illustrated one embodiment of my invention, that is now best known to me, but as is well recognized my invention may be given many other forms by those skilled in the art without departing in any wise from its generic spirit.

Figure 1:
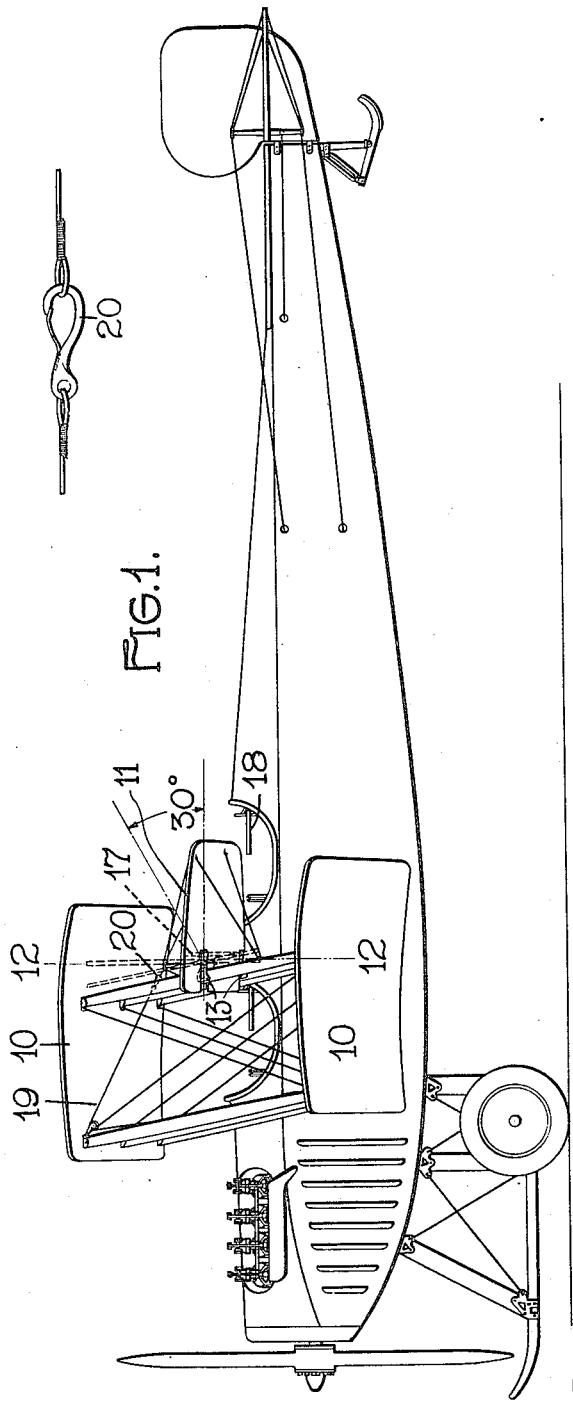
Figure 2:
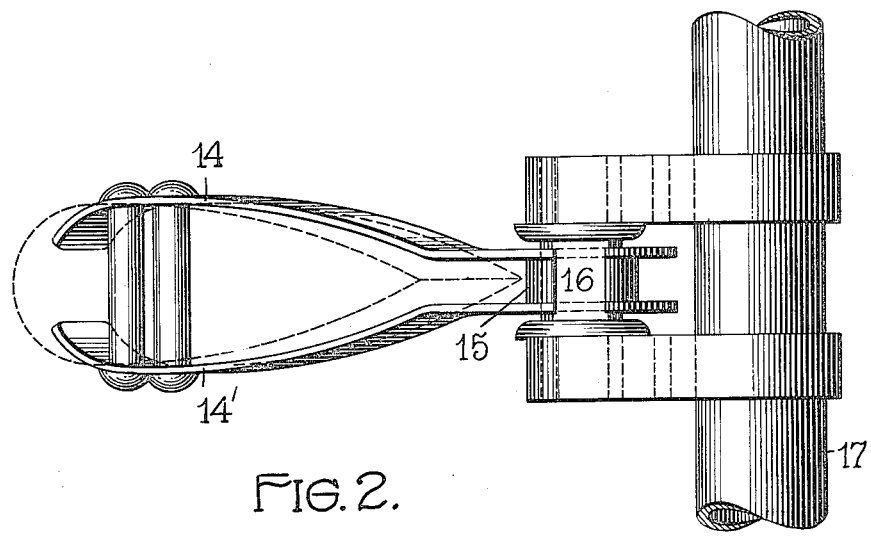
Figure 3:
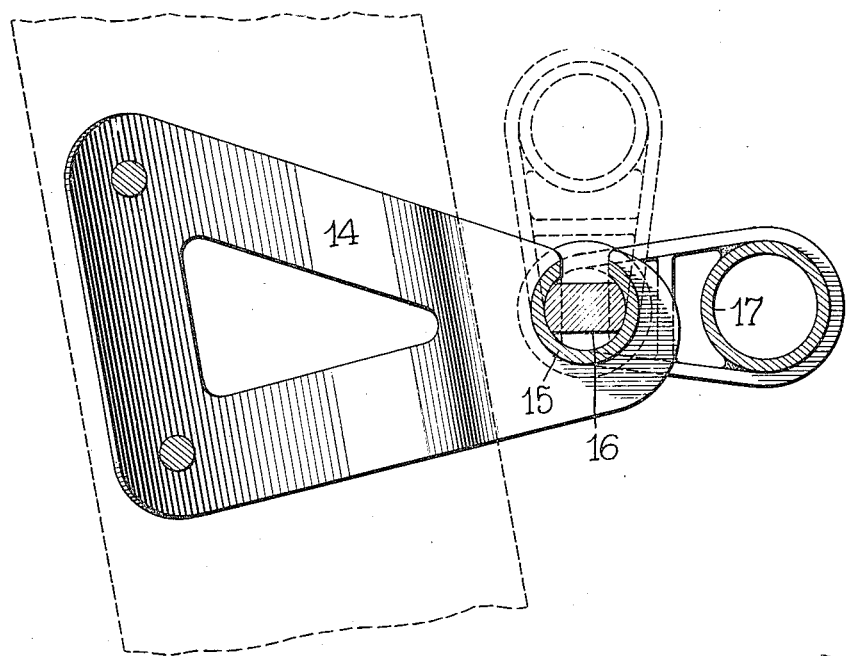

Of the drawings Figure 1 is a side elevation of an aeroplane in which the system of my invention has been embodied; Fig. 2 is a top plan view of a hinge which I have invented to facilitate the embodiment of my invention; Fig. 3 is a longitudinal vertical section of this hinge; and Fig. 4 is a view of a detail.

The parts will be referred to by the reference numerals by which they are designated upon the drawings.

(10). The main supporting surfaces of the aeroplane. As shown the aeroplane is of the biplane type, the upper and lower planes being spaced apart by suitable posts to form the biplane cell. The aeroplane as will be apparent may be of any known type, monoplane, triplane, tandem or other.

(11). The balancing surfaces or ailerons. Of these there are usually two, one disposed at each lateral extremity of the craft, though but one appears in the side elevation of Fig. 1. It is perfectly clear of course that its duplicate is at the opposite side of the craft.

(12, 12). This is the axis of pivotal connection of the aileron 11 with the posts.

(13). The hinges through which pivotal connection is made upon this axis. As clearly appears from Figs. 2 and 3, these hinges are of the positive lock type, but differ widely in construction from hinges of this type heretofore constructed.

(14, 14'). Two wings of the socket member of the hinge which embrace a post from opposite sides, a section of the post being shown in dotted lines.

(15). The socket of the hinge. This socket is a section of a tube brazed to the wings 14, 14', and slotted in the top. The top edges of the hinge wings 14, 14' are also slotted to register with the slot in the tube whereby the pin member of the hinge may be inserted without obstruction.

(16). The pin member of the hinge. This pin member is in general of cylindrical cross section and of a diameter corresponding to the inside diameter of the socket member 15, but it is cut flat at diametrically opposite points to a thickness adapting it to be inserted edgewise into the socket 15 by passage through the slot in its top.

(17). A metallic tube forming the main beam of the aileron structure. The hinge pin 16 is rigidly connected with this tube by means of metallic straps encircling its body, spaced apart, and positioning the pin with its flats in the plane of the body of the aileron as indicated in Figs. 2 and 3. A hinge of any other form of positive lock type may be substituted for this, but I prefer this which I have invented by reason of its obvious advantages.

(18). The aileron operating device. As indicated this consists of a shoulder fork of the Curtiss type, but any form of movable lever or wheel may be used.

(19). The connection between the operating device 18 and the ailerons 11. As clearly indicated this connection includes a snap hook 20 (Fig. 4) at the aileron 11. Any other form of quick detachable device may be included in this connection by means of which it may be snapped into and out of connection with the ailerons. The exact course of this connection to shoulder fork 18 is not shown, since this is immaterial.

As long as the ailerons 11 are in their normal horizontal positions substantially parallel to the main supporting surface 10, and further, as long as they are moved through their operating ranges, which extend through acute angles from their normal positions, it will be apparent from an inspection of Figs. 2 and 3 that the ailerons 11 are locked in pivotal connection with the craft. It being desired to knock down the craft for transportation or to remove the ailerons for any other reason, one has only to unsnap the connection 19, throw the aileron to a vertical or substantially vertical position with respect to the main supporting surface, lift the aileron bodily in the plane which it then occupies, and it is free. This operation takes but a moment or two. It is as readily again attached by simply presenting it to its axis 12 in the vertical position indicated approximately in dotted lines in Fig. 1, dropping it bodily a fraction of an inch until the hinge pins 16 strike the bottoms of the sockets 15, moving the aileron about its axis to normal position and snapping the connection 19 on; whereupon the balancing system is ready for immediate use. In this operation it will be observed no tool of any kind has been used and therefore wearing or tearing the fabric which covers the ailerons, and all wear and tear upon the pivotal connections themselves, has been absolutely eliminated; that the aileron may be readily handled by one man; and that in so handling it he need not change his original grasp upon it until it is in the position desired.

When my invention is embodied in a biplane, the plane of detachment is preferably parallel to the plane of the posts between the surfaces 10, 10', as indicated by the left hand dotted position.

I am aware that positive lock hinges have been heretofore used to attach rudders to the sterns of boats, and further that similar hinges have been used to attach doors and window blinds in place, that the said rudders, doors or blinds may be detached when in one angular position and not when in another, and I do not therefore claim broadly either the positive lock hinge, or a rudder pivoted to a body by means thereof. I do claim however the aileron system *per se*.

What I claim is:

1. In an aeroplane, main supporting planes, laterally disposed detachable balancing planes pivotally connected therewith normally occupying a position substantially parallel to said main planes and having an operative range limited to acute angles with said normal position, and removable by operation to a position at right angles to said main plane and bodily movement substantially vertical thereto.

2. In an aeroplane, main supporting surfaces, laterally disposed balancing rudders therefor normally lying in a plane substantially parallel to the main plane of the craft, locked pivotally to said main plane in said normal position and through operative ranges extending through an acute angle thereto, and rendered detachable by a bodily movement edgewise at substantially right angles to said main plane.

3. In an aeroplane, main support surfaces, lateral balancing surfaces pivotally connected thereto and normally occupying positions in planes substantially parallel to the planes of said main surfaces, in said position and throughout the normal operative range thereof pivotally locked to said main surface, but detachable by bodily movement in a plane substantially at right angles to said main supporting surfaces.

4. In an aeroplane, main supporting surfaces, lateral balancing surfaces pivotally connected thereto and normally occupying positions in planes substantially parallel to the planes of said main surfaces, in said position and throughout the normal operative range thereof pivotally locked to said main surface, but detachable by bodily movement in a plane substantially at right angles to said main supporting surfaces, together with operating cables to said balancing rudders including a snap connection.

5. In an aeroplane, a plurality of main supporting surfaces spaced apart by vertically extending posts, lateral balancing rudders pivotally connected directly with said posts intermediate the top and bottom supporting surfaces, normally occupying a position in a plane substantially parallel to the planes of said main supporting surfaces and movable about their pivotal axes through ranges making an acute angle with their normal planes, but detachable by a bodily movement in a plane substantially parallel to the plane of the spacing posts irrespective of the angle which the rudder makes with the main supporting surfaces.

6. In an aeroplane, main supporting surfaces, a frame structure fixing the positions of said surfaces, and lateral balancing rudders connected with said frame structure through hinge connections comprising a hinge member having a pair of wings which embrace a member of said frame, and a complemental hinge member connected with the aileron, the said hinge holding the aileron locked to the frame structure when the aileron is substantially parallel to the main supporting surfaces and releasing the aileron therefrom when it is moved to a position substantially vertical to the main supporting surfaces.

7. In an aeroplane, an aileron system comprising a pair of ailerons disposed at the opposite lateral extremities thereof, longitudinally extending main beams in said ailerons intermediate the leading and trailing edges of the same, and hinges pivotally and intermediately connecting the main beam of each aileron with the structure of said aeroplane.

8. In an aeroplane, an aileron system including lateral balancing surfaces centrally cut away for association with structural members of said aeroplane, a main beam for each surface exposed at the cut away portion of the surface only and hinge means pivotally mounting the exposed portion of said beam to the respective structural member.

In testimony whereof I affix my signature in presence of two witnesses.

HENRY KLECKLER.

Witnesses:
JANE O. MOORE,
GEO. M. BRALLA.

Copies of this patent may be obtained for five cents each, by addressing the "Commissioner of Patents, Washington, D. C."